W. H. STEVENSON, Jr.
CONTAINER FOR FRAGILE ARTICLES.
APPLICATION FILED MAY 7, 1919.
1,362,364.
Patented Dec. 14, 1920.
FIG.1.    FIG.2.    FIG.3.    FIG.4.
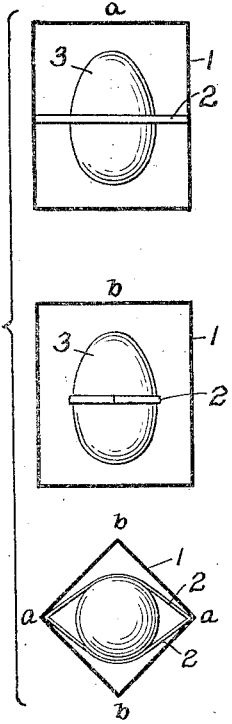 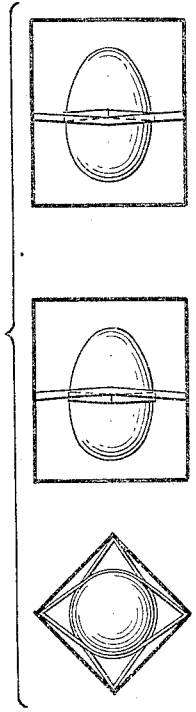 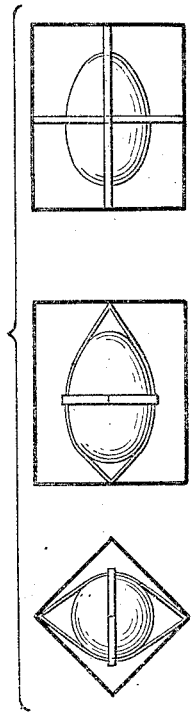 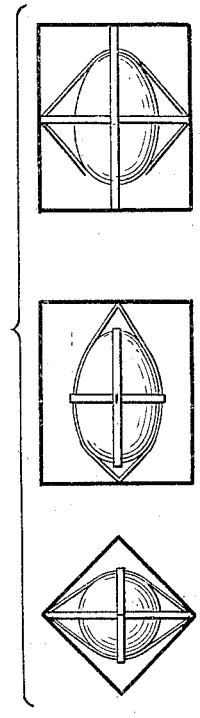
FIG.5.
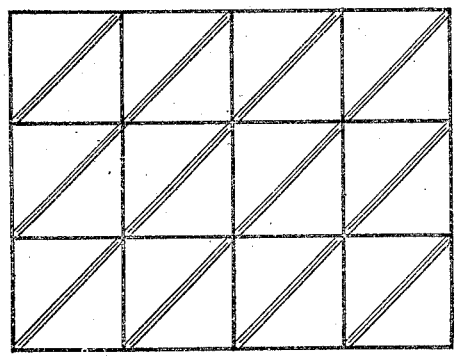
FIG.6.
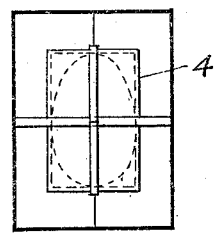
FIG.7.
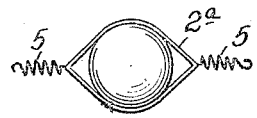
WITNESSES
INVENTOR
William H. Stevenson, Jr.
by Christy and Christy
his attorneys

UNITED STATES PATENT OFFICE.

WILLIAM H. STEVENSON, JR., OF PITTSBURGH, PENNSYLVANIA.

CONTAINER FOR FRAGILE ARTICLES.

1,362,364.  Specification of Letters Patent.  Patented Dec. 14, 1920.

Appliction filed May 7, 1919. Serial No. 295,342.

*To all whom it may concern:*

Be it known that I, WILLIAM H. STEVENSON, Jr., residing at Pittsburgh, in the county of Allegheny and State of Pennsylvania, a citizen of the United States, have invented or discovered certain new and useful Improvements in Containers for Fragile Articles, of which improvement the following is a specification.

My invention relates to improvements in containers for fragile articles; it is primarily applicable to the construction of egg crates; the objects in view are simplicity, cheapness, and adequacy.

The invention is illustrated in the accompanying drawings. Figure 1 shows in two vertical sections and in plan an egg-container of my invention with an egg in place within. The planes of section are indicated by the lines $a$—$a$ and $b$—$b$ of the plan view, and the two sections are correspondingly lettered. Figs. 2, 3, and 4 are corresponding sets of views, illustrating modifications in the embodiment of the invention. Fig. 5 is a plan view of an egg crate including a plurality of cells, with my invention, as illustrated in Fig. 1, embodied in its structure. Fig. 6 illustrates a wider applicability of my invention. Fig. 7 is a detached view in plan of a modification of the egg support of my invention, with an egg in place in it.

Referring, first, to Fig. 1, an egg carrier in simplest form is shown there; it consists of a single cell. Ordinarily, an egg crate includes many cells, but with explanation of the support for the egg (in which support my invention consists) within a single cell, the applicability of the invention to multi-cellular crates will become apparent.

The cell or container is for the egg (or other article to be carried, as, for example, an incandescent electric light bulb—for my invention is not limited to the carrying of eggs and eggs only, but is applicable to the carrying of fragile articles generally). The cell or container 1 is of proper shape and size to contain the egg, as shown, free at all points of contact with the cell wall. The cell may conveniently be rectangular, as shown; the particular form is, however, not essential to the invention.

Across the cell extends the egg support. It consists of a double elastic band, 2, preferably formed of rubber. The two plies of this band may be separated, and the egg 3 inserted in place between them, as shown. The width and the elasticity of the band 2 are such as to hold the egg in firm frictional engagement, and the anchoring of the ends of the band are so placed and the dimensions and the elasticity are so coördinated that, under all conditions of service, the egg will be firmly held in this elastic sling, and will not strike against the cell wall—at least it will not ordinarily strike with sufficient force to break it. The cell being rectangular as shown, the band may conveniently be stretched diagonally across the cell, from corner to corner, at a level near the mid-height of the cell. All this is shown in Fig. 1.

Fig. 2 shows that two pairs of bands may be used, extending at right angles one to the other, and engaging the egg (see the plan view) in substantially continuous contact about a medial zone.

Fig. 3 shows that two pairs of bands may be arranged to expand in two different planes. And it will be understood that, just as the pair of bands in one plane may be multiplied (*cf.* Figs. 1 and 2), so the pairs of bands may be multiplied in more planes than one, if desired. I have, however, for the sake of simplicity, shown in Fig. 3 but one pair of bands in each plane; and, ordinarily, one pair in each plane will suffice. Under some conditions at least, two pairs of bands in different planes will be more effective than two pairs in a single plane.

In Fig. 4 I show one pair of bands in each of three planes (the three planes corresponding to the three dimensions of the rectangular cell). Thus the number of planes may be increased; and, as has already been said, the number of bands in any one plane may be increased at pleasure. As the number of bands is increased, the width and strength of the several bands may be decreased.

Fig. 5 shows the simple arrangement of Fig. 1 applied to a multi-cellular egg crate. Supposing the crate to be made (as these crates now commonly are) of pasteboard, slits may be cut in the corners (with a penknife, if need be) and rubber bands threaded through and secured at the ends, and thus a quite inexpensive embodiment of my invention may be effected.

Fig. 6 shows that the egg may, if desired, be inclosed in a container 4 and then mounted, container and all, in the elastic sling of my invention. And this brings more prominently to attention again the fact already noted, that my invention may be applied to the carrying of fragile articles of all sorts; electric light bulbs, or, for another example, queen bees, which are customarily shipped through the mails.

Fig. 7 illustrates a modification of my elastic sling. In place of a double rubber band, here is shown a two ply band 2ª of material which need not be so notably elastic as rubber—canvas, e. g.—secured to coiled springs 5, which may be hooked to anchors in the opposite cell walls.

The inclosing walls of the cell or carton or crate or container will ordinarily be substantially continuous, but they may be discontinuous, if desired, either to afford ingress of air freely, or for economy's sake or for other reason. The essential requisites of the cell wall are, secure anchorage for the elastic sling, and proper protection of the contained articles. The term cell in the ensuing claims will be understood to cover constructions in which the walls are continuous as well as those in which the cell is reduced to a mere frame.

I claim as my invention:

1. A carrier for fragile articles consisting of a cell and a plurality of flat faced expansible and contractible bands extending across the cell, the breadth of the bands extending longitudinally of the cell, said bands being the immediate and only egg-engaging members, substantially as described.

2. An egg carrier consisting of a prismatic cell of greater length and diameter than the egg to be carried, and a plurality of flat-faced rubber bands extending across the cell, the breadth of the bands extending longitudinally of the cell.

3. A carrier for fragile articles consisting of a cell of prismatic shape and a sling formed of two bands of rubber stretched across the cell between opposite angles and at a point intermediate the length of the cell, substantially as described.

4. A carrier for fragile articles consisting of a cell and a sling, the sling consisting of two bands, of width greater than their thickness, extending across the cell, normally face to face, flexible, expansible and separable one from another, the breadth of the bands extending longitudinally of the cell, said bands being the immediate and only egg-engaging members, substantially as described.

5. A carrier for fragile articles consisting of a cell and a sling formed of a plurality of pairs of rubber bands stretched across the cell in a single plane transverse to and intermediate of the length of the cell and between different pairs of opposite points, and engaging the surface of an introduced article over one continuous zone, substantially as described.

In testimony whereof I have hereunto set my hand.

WILLIAM H. STEVENSON, Jr.

Witnesses:
BAYARD H. CHRISTY,
FRANCIS J. TOMASSON.